United States Patent
Stibl et al.

(10) Patent No.: US 7,398,679 B2
(45) Date of Patent: Jul. 15, 2008

(54) METHOD FOR MEASURING PROPERTIES OF A ROTATIONAL BODY

(75) Inventors: Bernd Stibl, Tettnang (DE); Hermann Mokesch, Ravensburg (DE)

(73) Assignee: Voith Paper Patent GmbH, Heidenheim (DE)

( * ) Notice: Subject to any disclaimer, the term of this patent is extended or adjusted under 35 U.S.C. 154(b) by 261 days.

(21) Appl. No.: 11/270,734

(22) Filed: Nov. 10, 2005

(65) Prior Publication Data

US 2006/0137482 A1    Jun. 29, 2006

(30) Foreign Application Priority Data

Nov. 12, 2004   (DE) .................. 10 2004 054 802

(51) Int. Cl.
   *G01B 5/28* (2006.01)
(52) U.S. Cl. ........................................ 73/105
(58) Field of Classification Search .............. None
   See application file for complete search history.

(56) References Cited

U.S. PATENT DOCUMENTS

| | | | | |
|---|---|---|---|---|
| 3,720,818 A | * | 3/1973 | Spragg et al. | 702/168 |
| 4,184,263 A | | 1/1980 | Tatsumi et al. | |
| 4,764,767 A | * | 8/1988 | Ichikawa et al. | 340/870.31 |
| 5,117,081 A | | 5/1992 | Bagdal | |
| 6,460,422 B1 | | 10/2002 | Kuroda et al. | |
| 6,736,705 B2 | * | 5/2004 | Benning et al. | 451/41 |
| 2003/0160133 A1 | | 8/2003 | Moretti et al. | |

FOREIGN PATENT DOCUMENTS

EP    0507553    10/1992

* cited by examiner

*Primary Examiner*—Robert R Raevis
(74) *Attorney, Agent, or Firm*—Greenblum & Bernstein, P.L.C.

(57) ABSTRACT

Method for determining a specific property of a rotating body, including measuring using a measuring method in which the signal obtained is composed of N properties, the property to be determined being contained therein, measuring using at least one other measuring method, in which the signal obtained or the signals obtained is or are composed of only some of the N properties, and determining the specific property from the measured signals obtained.

20 Claims, 1 Drawing Sheet

METHOD FOR MEASURING PROPERTIES OF A ROTATIONAL BODY

CROSS-REFERENCE TO RELATED APPLICATIONS

The present application claims priority under 35 U.S.C. §119 of German Patent Application No. 10 2004 054 802.1, filed Nov. 12, 2004, the disclosures of which is expressly incorporated by reference herein in its entirety.

BACKGROUND OF THE INVENTION

1. Field of the Invention

This invention relates to a method for determining a specific property of a rotational body, such as surface contour of the roll surface or concentricity, state of oscillation, deflection and the like.

2. Discussion of Background Information

Such a method can be used, for example but not exclusively, for measuring such properties in a web processing machine, such as a paper or board or tissue machine, or else in roll grinding machines.

During the measurement, for example, of the radial concentricity of rotational bodies, such as rolls in a paper machine, in the methods known from the prior art, a signal is picked up with the aid of one or more distance sensors.

In this case, the distance from a fixed point to the roll surface is measured. If the cross section of the roll is exactly round, then no distance change will be measured. If the cross section has irregularities, for example in the form of bulges or corrugations, the distance sensor measures a distance which changes continually.

This measured result indicates the irregularity of the roll surface, if the point of rotation of the rotating roll does not move.

However, if the point of rotation moves, for example because of mechanical oscillations, then a distance sensor measures a distance change even if the cross section is perfect and has no irregularities in the form of bulges and corrugations, for example.

This means that, with a single distance sensor, no distinction can be drawn between mechanical oscillations of the roll and irregularities in the surface contour of the roll surface.

It follows from this that, if only a single distance sensor is used, a signal is measured which is composed of the superimposition of the surface contour of the roll surface and mechanical oscillations of the roll.

The prior art discloses a method in which four distance sensors are arranged over an angle of 180° over the roll circumference. The application of this method in the case of rolls leads to problems which are only accessible to a limited extent. Furthermore, the method is complicated to perform.

SUMMARY OF THE INVENTION

The present invention provides a method with which a specific property of a rotating body, in particular a roll or a cylinder, can be measured simply and exactly and without the superimposition of another property, with a limited amount of space required for the measuring arrangement.

The present invention provides a method for determining a specific property of a rotating body, having the following steps:

Measuring by means of a measuring method in which the signal obtained is composed of N properties, the property to be determined being contained therein, Measuring by means of at least one other measuring method, in which the signal obtained or the signals obtained is or are composed of only some of the N properties, Determining the specific property from the signals obtained.

The method according to the invention is based on the finding of combining various measuring methods cleverly with one another and thus generating signals with different information content with respect to the superimposition of properties of a rotating body. Thus, redundant components of the signals can be eliminated.

This makes it possible to obtain the specific property unambiguously from the consideration of the signals.

Advantageous refinements and developments of the invention are also specified herein.

According to one preferred refinement of the invention, a uniquely determined system of equations, in particular a linear system of equations, is set up from the measured signals and the specific property is determined from the system of equations.

One practical development of the invention provides for (N-1) signals to be determined with the at least one other measuring method, said signals in each case being composed of the superimposition of (N-1) properties. In this case, all (N-1) signals are composed of at least one common property. Furthermore, the (N-1) signals differ in at least one property.

For instance, this means that, with the first measuring method, a signal A is generated which is composed as follows:

$A = a^*x + b^*y + c^*z$, where $x, y, z$ are signal components of the various properties.

Furthermore, with other measuring methods, for example the following signals are determined:

$B = d^*x + e^*y$             2nd measuring method $C = f^*y + g^*z$             3rd measuring method From the signals, a specific property can thus be determined unambiguously.

A further practical embodiment of the method according to the invention provides for two different measuring methods to be used, the signal from one measuring method being composed of the superimposition of two properties and the signal from the other measuring method being composed of only one property.

In this case, one measuring method advantageously generates a signal which is obtained as a result of superimposing mechanical oscillations of the rotating body and the surface contour of the rotating body. The signal obtained with the other measuring method is in this case generated only as a result of mechanical oscillations, that is to say this is therefore a pure oscillation measurement.

The specific property which is determined in this case is the surface contour of the rotating body.

The surface contour of the rotating body can be, for example, the contour of the circumferential surface of a roll or of a cylinder. In this case, for example with the first measuring method, radial irregularities in the circumferential surface superimposed on radial oscillations of the roll are thus measured, whereas with the second measuring method only the oscillations are measured.

The surface contour of the rotating body can also be, for example, the contour of the end face of a roll or of a cylinder. In this case, for example with the first measuring method, axial irregularities of the end face superimposed on axial oscillations of the roll are thus measured, whereas with the second measuring method only the oscillations are measured.

It has been shown that, in order to carry out the method according to the invention, in each case only one measuring sensor is required for each measuring method. This means that, for example in order to determine the surface contour of the circumferential surface of a roll by means of the two different measuring methods mentioned above (the first measuring method generates a signal which is obtained as a result of superimposing mechanical oscillations of the rotating body and the surface contour of the rotating body, the other measuring method generates a signal which is obtained only as a result of mechanical oscillations), a total of only two measuring sensors are needed, whereas in the method for concentricity measurement known from the prior art, four measuring sensors distributed over the angular range of 180° are needed.

Thus, by means of the method according to the invention, the result is a considerable space and cost advantage as compared with the method known from the prior art.

Different measuring methods are conceivable for determining the properties, such as the mechanical oscillation, surface contour or deflection or dynamic deformation, of a rotating roll. According to a preferred embodiment of the invention, at least one measuring method operates without contact. In this case, for example, laser sensors and/or inductive sensors and/or sensors which operate on the eddy current principle can be used.

In practical terms, the one measuring method in which a signal is obtained as a result of superimposing mechanical oscillations and the surface of the rotating body is a distance measuring method. This measuring method advantageously operates in accordance with the triangulation principle.

The other measuring method, in which a signal is obtained only as a result of the mechanical oscillations of the rotating body, is advantageously an interferometric measuring method. This measuring method advantageously operates in accordance with the laser vibrometry principle or in accordance with the radar doppler principle.

Practical applications of the invention are concentricity measurements on rolls in a paper, board or tissue machine or a printing press or concentricity measurements in roll grinding machines or balancing machines.

That according to the invention is advantageously employed at the machine operating speed of the corresponding abovementioned machine. It is possible in this case, for example in the case of a paper machine, to monitor the state of rolls during running production and to intervene in a regulatory manner in order to keep the production process stable.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the sole Figure of drawings by way of non-limiting example of exemplary embodiments of the present invention, and wherein.

DETAILED DESCRIPTION OF THE PRESENT INVENTION

Figure 1:
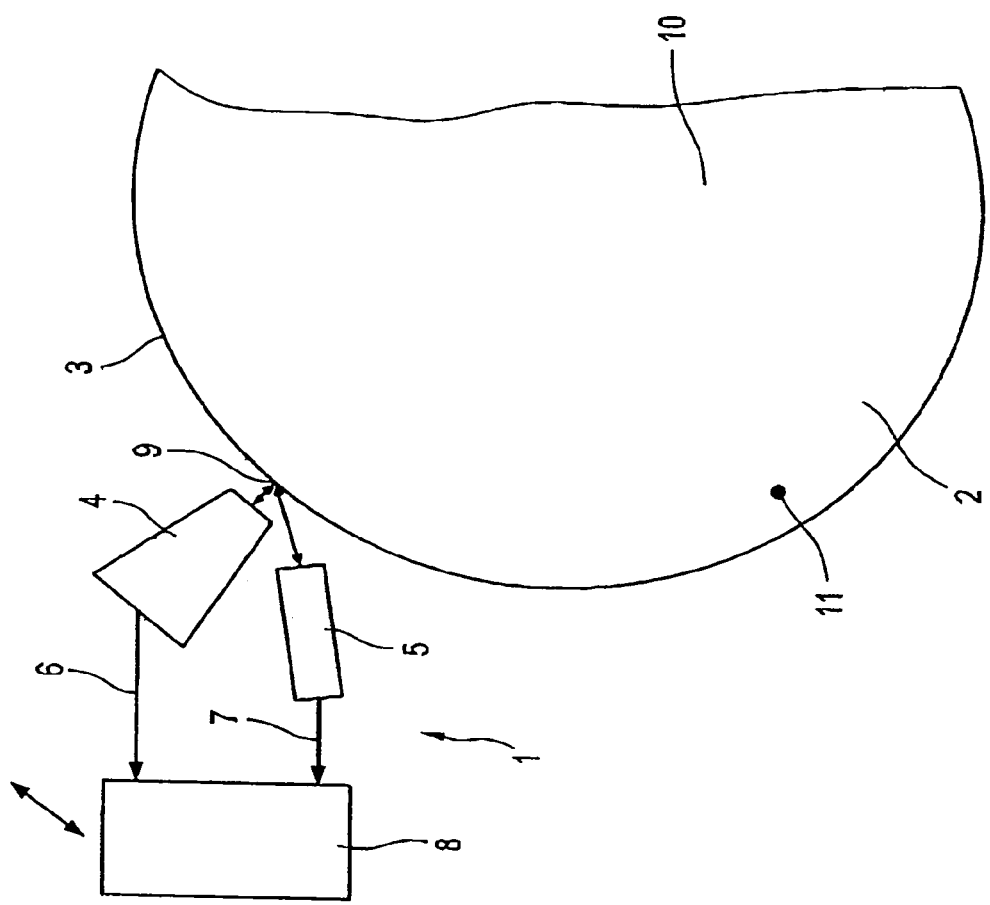
FIG. 1 shows an apparatus for carrying out the method according to the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows an apparatus 1 for carrying out the method according to the invention for measuring a property of a rotating body.

In the present exemplary embodiment, the rotating body is a roll 2, of which a section is illustrated. The roll 2 rotates about an axis of rotation 10.

In order to carry out the method according to the invention, by means of a first measuring sensor 4, this is a distance sensor which operates in accordance with the triangulation principle, a signal 6 is measured at a measurement location 9, said signal being composed of the superimposition of two properties, namely the surface contour of the roll surface 3 and the mechanical oscillations of the roll 2.

Furthermore, by means of a second measuring sensor 5, this is a pure oscillation sensor which operates in accordance with the laser vibrometry principle, a signal 7 is measured at the measurement location 9, said signal being composed only of pure oscillation signals of the roll 2.

It should be noted that the measurement location 9 is to be understood to be a region which exactly comprises the same point or else comprises two measurement points which are arranged at a distance from each other in a range of at most 10 mm to 20 mm.

Accordingly, both measuring sensors 4 and 5 operate without contact.

The two signals 6 and 7 are supplied to an evaluation unit 8, which determines the surface contour of the roll surface 3 from the two signals 6 and 7.

From the two signals 6, 7, in the evaluation unit 8 a uniquely determined system of equations, in particular a linear system of equations, is set up and the surface contour of the roll surface 3 along the circumferential line at the measurement location 9 is determined from the system of equations.

In order to measure the surface contour of the roll surface 3 over a part of the width of the roll 2 or over the entire width of the roll 2, provision is made in the present embodiment for measurements to be carried out at different measurement locations in order to measure the surface contour of the roll surface 3, the measurement locations 9 being arranged offset from one another along the axis of rotation 10.

In this way, under the control of a trigger signal 11, a move is in each case made to a new measurement location 9 in order to obtain the surface contour of the roll surface 3 over the entire width of the roll 2.

In the present embodiment, the trigger signal 11 is in each case triggered at a complete revolution of the roll 2.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for determining a specific property of a rotating body, having the following steps:
    obtaining a first signal from a first sensor directed at a first location on the rotating body, the first signal corresponding to N properties of the first location, including the specific property;
    obtaining a second signal from a second sensor directed at a second location on the rotating body, the second signal corresponding to only some of the N properties at the second location;
    determining the specific property for a measurement location comprising the first and second locations from the first and second signals.

2. The method as claimed in claim 1, wherein a system of equations corresponding to the first and second signals is set up and the specific property is determined from the system of equations.

3. The method as claimed in claim 1, wherein the second signal corresponds to (N-1) superimposed signals, which correspond to (N-1) properties, so the superimposed signals individually include at least one common property and at least one differing property.

4. The method as claimed in claim 1, wherein two different measuring methods are used by the first and second sensors, whereby the first signal, obtained by a first measuring method, is composed of a superimposition of two properties and the second signal, obtained by a second measuring method, is composed of only one property.

5. The method as claimed in claim 4, wherein the first signal obtained with the first measuring method is obtained as a result of superimposing mechanical oscillations of the rotating body and the surface contour of the rotating body and the second signal obtained with the second measuring method is obtained as a result of mechanical oscillations.

6. The method as claimed in claim 5, wherein the specific property is a surface contour of a circumferential surface.

7. The method as claimed in claim 5, wherein the specific property is a surface contour of an end face of one of a roll and a cylinder.

8. The method as claimed in claim 5, wherein the specific property is a surface contour of the rotating body.

9. The method as claimed in claim 8, wherein the first measuring method comprises a distance measuring method, and the first signal comprises a superimposition of mechanical oscillations and a surface contour of the rotating body.

10. The method as claimed in claim 8, wherein the second measuring method comprises an interferometric measuring method, such that the second signal is obtained as a result of mechanical oscillations of the rotating body.

11. The method as claimed in claim 4, wherein in each case only one sensor is used for each measuring method.

12. The method as claimed in claim 4, wherein the one measuring method operates in accordance with the triangulation principle.

13. The method as claimed in claim 12, wherein the second measuring method operates in accordance with one of a laser vibrometry principle or a doppler radar principle.

14. The method as claimed in claim 1, wherein at least one of the first and second sensors operates without contact.

15. The method as claimed in claim 1, wherein the measurement of the specific property is carried out in a section which extends in the direction of an axis of rotation of the rotating body.

16. The method as claimed in claim 15, wherein, in order to measure the specific property of a section of a surface of the rotating body, the first and second locations are arranged offset from one another along the axis of rotation.

17. The method as claimed in claim 16, wherein, under the control of a trigger signal, the specific property for a new measurement location is determined.

18. The method as claimed in claim 17, wherein the trigger signal triggered at a complete revolution of the rotating body.

19. The method as claimed in claim 15, wherein the first and second locations are a same location.

20. The method as claimed in claim 15, wherein the first and second locations overlap each other.

* * * * *